United States Patent
Mori

(10) Patent No.: US 10,225,436 B2
(45) Date of Patent: Mar. 5, 2019

(54) IMAGE PROCESSING APPARATUS, AND METHOD AND COMPUTER-READABLE MEDIUM THEREFOR

(71) Applicant: BROTHER KOGYO KABUSHIKI KAISHA, Nagoya, Aichi (JP)

(72) Inventor: Kosuke Mori, Handa (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 14 days.

(21) Appl. No.: 15/675,121

(22) Filed: Aug. 11, 2017

(65) Prior Publication Data

US 2018/0054546 A1 Feb. 22, 2018

(30) Foreign Application Priority Data

Aug. 18, 2016 (JP) .................. 2016-160773

(51) Int. Cl.
*H04N 1/12* (2006.01)
*H04N 1/40* (2006.01)
(Continued)

(52) U.S. Cl.
CPC ..... *H04N 1/40012* (2013.01); *G06K 9/00442* (2013.01); *G06K 9/3275* (2013.01); *G06K 9/38* (2013.01); *G06T 5/40* (2013.01); *G06T 7/11* (2017.01); *G06T 7/136* (2017.01); *H04N 1/00411* (2013.01); *H04N 1/00602* (2013.01); *H04N 1/00702* (2013.01); *H04N 1/121* (2013.01); *H04N 1/387* (2013.01); *H04N 1/3878* (2013.01); *G06T 2207/10008* (2013.01);
(Continued)

(58) Field of Classification Search
None
See application file for complete search history.

(56) References Cited

U.S. PATENT DOCUMENTS 5,422,735 A 6/1995 Ogawa
5,956,421 A 9/1999 Tanaka et al.
(Continued)

FOREIGN PATENT DOCUMENTS

JP H07-087313 A 3/1995
JP H09-305754 A 11/1997

*Primary Examiner* — Anh-Vinh T Nguyen
(74) *Attorney, Agent, or Firm* — Scully, Scott, Murphy & Presser, PC

(57) ABSTRACT

An image processing apparatus includes a controller configured to control an image scanner to scan a document sheet and generate target image data, generate an original histogram of an index value representing a luminance of each pixel forming the target image data, determine whether a particular condition is satisfied that includes a requirement that a difference value between an orientation of the document sheet and a reference orientation in the image scanning process is equal to or larger than a particular value, when the particular condition is satisfied, calculating a count of out-of-document pixels other than pixels representing an image of the document sheet, generate an adjusted histogram by subtracting at least a part of the count of the out-of-document pixels from frequencies of index values within a particular range in the original histogram, setting a specific threshold of the index value for binarization processing, based on the adjusted histogram.

13 Claims, 11 Drawing Sheets

(51) Int. Cl.
*H04N 1/00* (2006.01)
*G06K 9/38* (2006.01)
*G06T 5/40* (2006.01)
*H04N 1/387* (2006.01)
*G06T 7/11* (2017.01)
*G06T 7/136* (2017.01)
*G06K 9/00* (2006.01)
*G06K 9/32* (2006.01)
*H04N 1/405* (2006.01)

(52) U.S. Cl.
CPC .... *G06T 2207/30176* (2013.01); *H04N 1/405* (2013.01); *H04N 2201/0094* (2013.01)

(56) References Cited

U.S. PATENT DOCUMENTS

| | | | | |
|---|---|---|---|---|
| 6,758,399 B1 * | 7/2004 | Brunelli | .................... | G06K 7/14 235/454 |
| 8,712,188 B2 * | 4/2014 | Roy | ....................... | H04N 1/387 358/462 |
| 9,451,126 B2 * | 9/2016 | Ozawa | ................. | H04N 1/3878 |
| 2002/0028027 A1 * | 3/2002 | Koyama | ............... | G06F 17/145 382/289 |
| 2003/0133608 A1 * | 7/2003 | Bernstein | ............. | H04N 1/4097 382/163 |
| 2004/0184674 A1 * | 9/2004 | Lim | ..................... | G06K 9/3283 382/275 |
| 2004/0240737 A1 * | 12/2004 | Lim | ...................... | G06K 9/325 382/182 |
| 2011/0043864 A1 * | 2/2011 | Tian | .................... | H04N 1/3878 358/3.26 |
| 2012/0093434 A1 * | 4/2012 | Banerjee | ............ | G06K 9/3283 382/266 |
| 2012/0106844 A1 * | 5/2012 | Ramachandrula | ... | H04N 1/3878 382/173 |
| 2012/0120444 A1 * | 5/2012 | Hirohata | ............ | G06K 9/00449 358/1.15 |
| 2014/0362248 A1 * | 12/2014 | Ishida | ................ | H04N 5/23293 348/222.1 |
| 2015/0222786 A1 * | 8/2015 | Ahmad | ................ | H04N 1/3878 358/448 |
| 2015/0324390 A1 * | 11/2015 | Macciola | ........... | G06K 9/00463 707/769 |

* cited by examiner

| SCANNING MODE | SETTING OF SCANNING AREA BASED ON DOCUMENT POSITION | SCANNING OF EXTENDED AREA |
|---|---|---|
| M1 | ○ | × |
| M2 | ○ | ○ |
| M3 | × | × |

FIG. 6

1st SCANNING MODE M1

IMAGE PROCESSING APPARATUS, AND METHOD AND COMPUTER-READABLE MEDIUM THEREFOR

CROSS-REFERENCE TO RELATED APPLICATION

This application claims priority under 35 U.S.C. § 119 from Japanese Patent Application No. 2016-160773 filed on Aug. 18, 2016. The entire subject matter of the application is incorporated herein by reference.

BACKGROUND

Technical Field

The following description relates to aspects of an image processing apparatus, and a method and a computer-readable medium for the image processing apparatus.

Related Art

Binarization processing is one of various kinds of image processing for image data. Specifically, the binarization processing is a process to generate binary image data formed by white pixels and black pixels, by comparing a value of each pixel included in multi-level image data (e.g., 256 gradation image data) with a threshold and converting the value of each pixel into one of a gradation value representing white and a gradation value representing black based on the comparison result. For instance, the binarization processing may be performed to reduce a data capacity of image data. Further, for instance, the binarization processing may be performed as pre-processing of particular image processing (e.g., optical character recognition processing).

For instance, as a thresholding method for the binarization processing, a discrimination analysis method (i.e., Otsu's method) has been known. The discrimination analysis method is a method to, while changing a threshold A from a minimum value to a maximum value in a histogram of values (e.g., luminance values) of pixels included in image data, find and set, as the threshold for the binarization processing, a specific threshold A that maximizes a ratio of a between-class variance to a within-class variance of two classes of pixels separated by the specific threshold A.

SUMMARY

In the known method, it might be impossible to perform appropriate binarization processing for target image data generated by scanning a document sheet. Specifically, in general, image scanning of the document sheet is performed over a scanning area having a particular shape (e.g., a rectangular shape) oriented in a particular direction. Hence, when an orientation of the document sheet is not coincident with the orientation of the scanning area in the image scanning, a plurality of pixels forming the generated target image data include out-of-document pixels other than document pixels representing the document sheet, at a particular rate or more. In this case, when a threshold for binarization processing is set based on a histogram of luminance values of the pixels forming the target image data, the set threshold is affected by not only luminance values of the document pixels but also luminance values of the out-of-document pixels. Thus, in the known method, it might be impossible to set an appropriate threshold for an actual image of the document sheet. Consequently, it might be impossible to perform appropriate binarization processing to generate appropriate binary image data of the document sheet.

Aspects of the present disclosure are advantageous to provide one or more improved techniques that make it possible to perform appropriate binarization processing to generate appropriate binary image data of a document sheet.

According to aspects of the present disclosure, an image processing apparatus is provided that includes an image scanner and a controller configured to perform a binary image data generating process. The binary data generating process includes controlling the image scanner to perform an image scanning process to scan a document sheet, thereby generating target image data formed by a plurality of pixels, generating an original histogram of an index value representing a luminance of each of the plurality of pixels forming the target image data, determining whether a particular condition is satisfied, the particular condition including a requirement that a difference value between an orientation of the document sheet and a reference orientation in the image scanning process is equal to or larger than a particular value, in response to determining that the particular condition is satisfied, calculating a count of out-of-document pixels included in the plurality of pixels forming the target image data, the out-of-document pixels being pixels other than pixels representing an image of the document sheet, generating an adjusted histogram by subtracting at least a part of the count of the out-of-document pixels from frequencies of index values within a particular range in the original histogram, setting a specific threshold of the index value for binarization processing, based on the adjusted histogram, and performing binarization processing to generate binary image data from the target image data, using the specific threshold set based on the adjusted histogram.

According to aspects of the present disclosure, further provided is a method implementable on a processor coupled with an image scanner. The method includes controlling the image scanner to perform an image scanning process to scan a document sheet, thereby generating target image data formed by a plurality of pixels, generating an original histogram of an index value representing a luminance of each of the plurality of pixels forming the target image data, determining whether a particular condition is satisfied, the particular condition including a requirement that a difference value between an orientation of the document sheet and a reference orientation in the image scanning process is equal to or larger than a particular value, in response to determining that the particular condition is satisfied, calculating a count of out-of-document pixels included in the plurality of pixels forming the target image data, the out-of-document pixels being pixels other than pixels representing an image of the document sheet, generating an adjusted histogram by subtracting at least a part of the count of the out-of-document pixels from frequencies of index values within a particular range in the original histogram, setting a specific threshold of the index value for binarization processing, based on the adjusted histogram, and performing binarization processing to generate binary image data from the target image data, using the specific threshold set based on the adjusted histogram.

According to aspects of the present disclosure, further provided is a non-transitory computer-readable medium storing computer-readable instructions that are executable on a processor coupled with an image scanner The instructions are configured to, when executed by the processor, cause the processor to control the image scanner to perform an image scanning process to scan a document sheet, thereby generating target image data formed by a plurality of pixels, generate an original histogram of an index value representing a luminance of each of the plurality of pixels forming the target image data, determine whether a particular condition is satisfied, the particular condition including a requirement that a difference value between an orientation of the document sheet and a reference orientation in the image scanning process is equal to or larger than a particular value, in response to determining that the particular condition is satisfied, calculate a count of out-of-document pixels included in the plurality of pixels forming the target image data, the out-of-document pixels being pixels other than pixels representing an image of the document sheet, generate an adjusted histogram by subtracting at least a part of the count of the out-of-document pixels from frequencies of index values within a particular range in the original histogram, set a specific threshold of the index value for binarization processing, based on the adjusted histogram, and perform binarization processing to generate binary image data from the target image data, using the specific threshold set based on the adjusted histogram.

BRIEF DESCRIPTIONS OF THE ACCOMPANYING DRAWINGS

FIG. 6 shows differences among first to third scanning modes for image scanning by the image scanner of the MFP, in the illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

1. Illustrative Embodiment

1-1. Configuration of MFP

Figure 1:
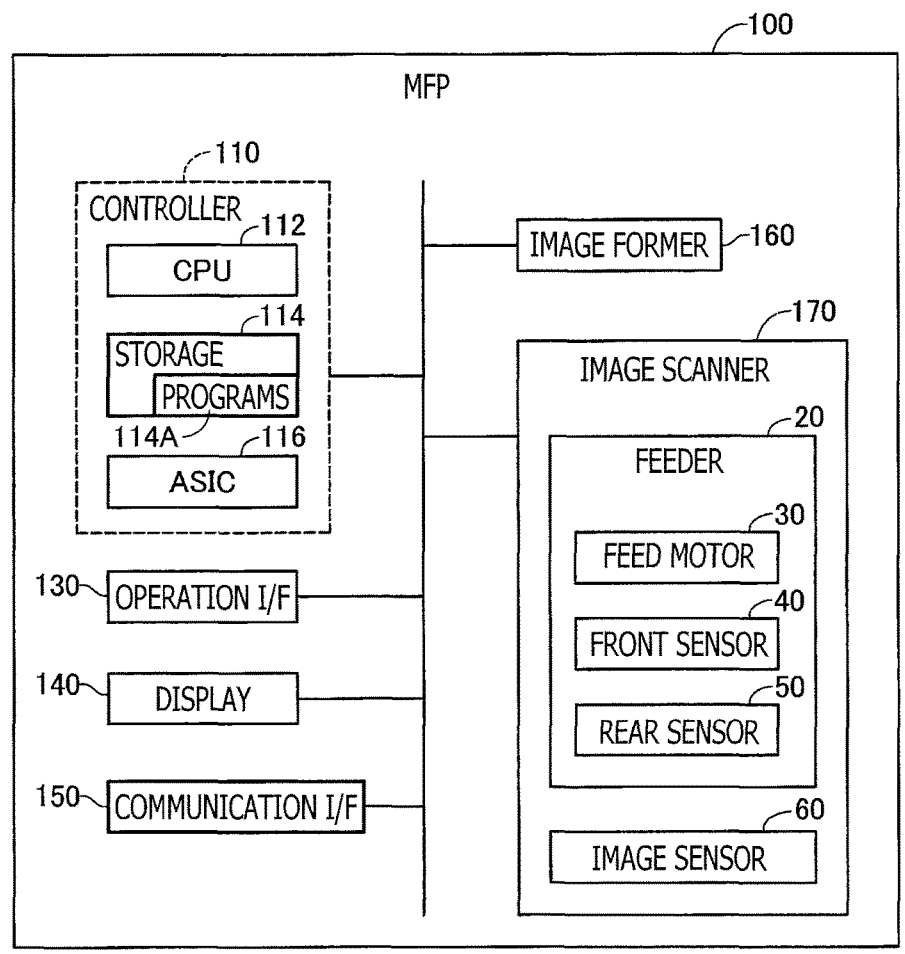
FIG. 1 is a block diagram schematically showing a configuration of a multi-function peripheral (hereinafter referred to as an "MFP") in an illustrative embodiment according to one or more aspects of the present disclosure.

FIG. 1 is a block diagram showing an electrical configuration of a multi-function peripheral (hereinafter referred to as an "MFP") 100 in an illustrative embodiment according to aspects of the present disclosure. The MFP 100 has a plurality of functions such as a scanning function, a printing function, and a copy function. The MFP 100 includes a controller 110, an operation I/F ("I/F" is an abbreviated form of "interface") 130, a display 140, a communication I/F 150, an image former 160, and an image scanner 170. The above elements included in the MFP 100 are interconnected via a bus.

The operation I/F 130 includes various operable members such as buttons and switches, and a touch panel. The operation I/F 130 is configured to accept instructions from a user. For instance, the operation I/F 130 accepts an instruction to execute a below-mentioned binary image data generating process. The display 140 includes a liquid crystal display. The display 140 is configured to display various setting screens and a screen for showing an operating state of the MFP 100. The communication I/F 150 is configured to communicate with external apparatuses and devices. The image former 160 is a hardware element configured to form an image on a sheet (e.g., a paper) in an electrophotographic method or an inkjet method.

The image scanner 170 is a hardware element configured to scan an image of a document sheet DO and generate image data representing the scanned image. The image scanner 170 includes a feeder 20 and an image sensor 60. The feeder 20 is configured to feed the document sheet DO along a below-mentioned feeding path R1. The image sensor 60 is configured to optically scan the document sheet DO. The feeder 20 includes a feed motor 30, a front sensor 40, and a rear sensor 50. The feed motor 30 is a power source for feeding the document sheet DO. The front sensor 40 is configured to detect whether there exists a document sheet DO in a below-mentioned first reference position DP1 on the feeding path R1. The rear sensor 50 is configured to detect whether there exists a document sheet DO in a below-mentioned second reference position DP2 on the feeding path R1.

Figure 2:
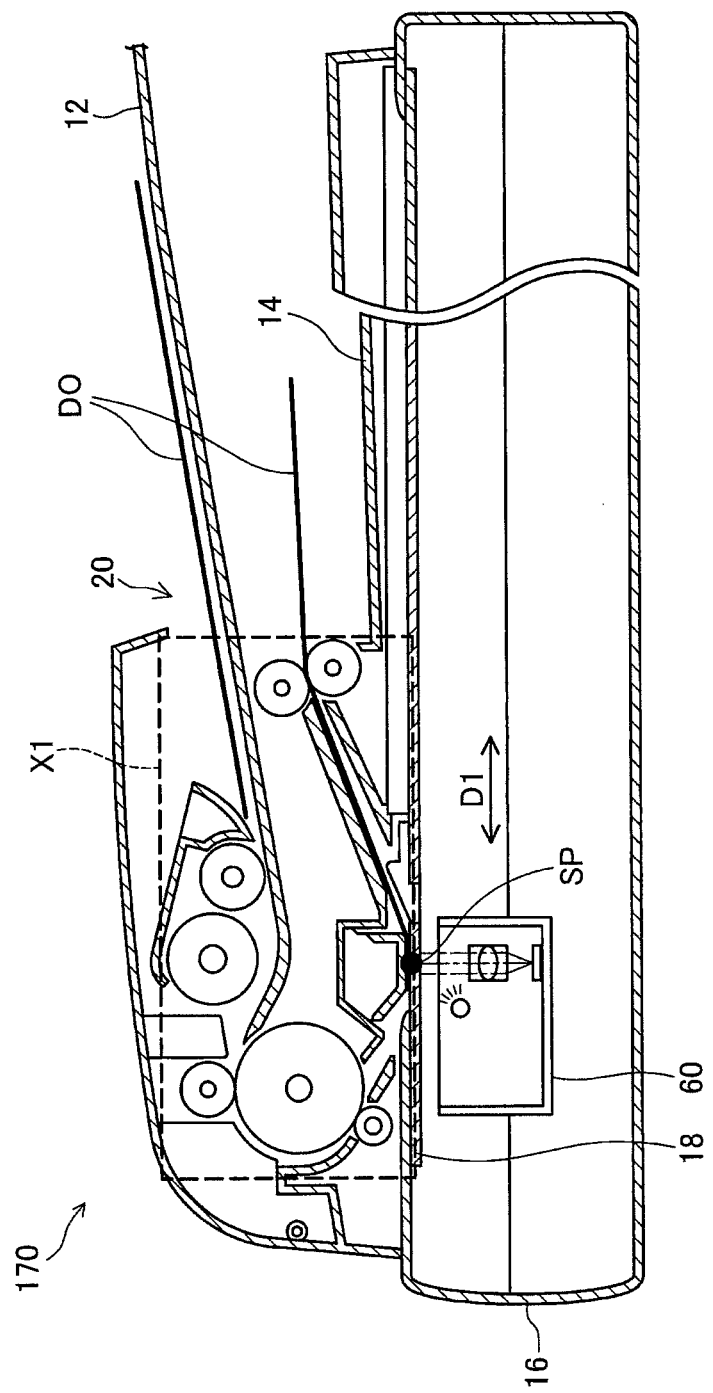
FIG. 2 is a cross-sectional view showing a configuration of an image scanner included in the MFP in the illustrative embodiment according to one or more aspects of the present disclosure.
Figure 3:
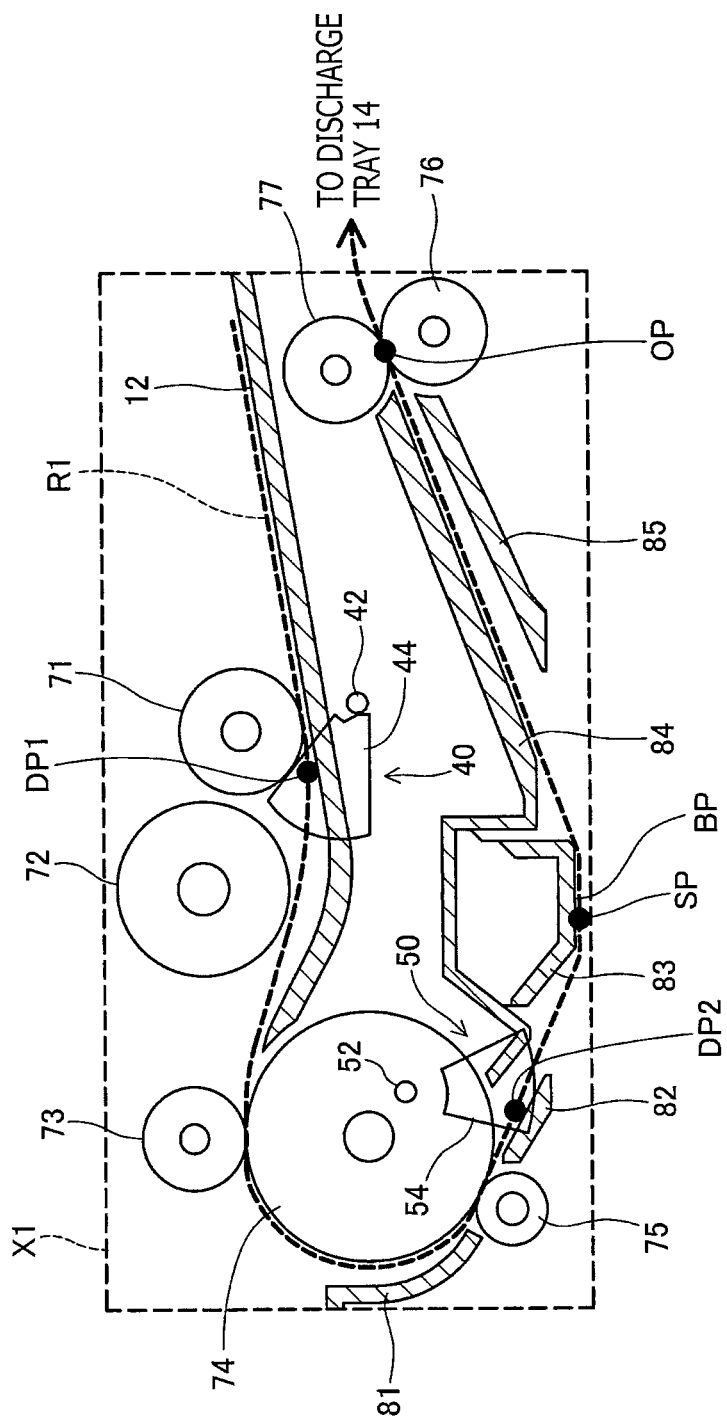
FIG. 3 is an enlarged view of a section X1 shown in FIG. 2, in the illustrative embodiment according to one or more aspects of the present disclosure.

Referring to FIGS. 2 and 3, the configuration of the image scanner 170 will be described in further detail. FIG. 2 is a cross-sectional view schematically showing the configuration of the image scanner 170. FIG. 3 is an enlarged view of a section X1 shown in FIG. 2. Although the following features are not shown in any drawings, the MFP 100 of the illustrative embodiment has the image former 160 disposed below the image scanner 170 shown in FIG. 2.

As shown in FIG. 2, the image scanner 170 includes a housing 16 configured to accommodate the image sensor 60. The image sensor 60 is configured to move along a sub scanning direction (i.e., a left-to-right direction in FIG. 2) D1 inside the housing 16. An upper surface of the housing 16 includes a transparent document table 18. The feeder 20 is disposed above the housing 16. The feeder 20 is supported in an openable and closable manner by a hinge (not shown) disposed close to an end portion of the upper surface of the housing 16.

Scanning methods for the image scanner 170 to scan the document sheet DO include a flatbed method and an ADF method. The flatbed method is a method in which the image sensor 60 scans the document sheet DO statically placed on the document table 18 while moving along the sub scanning direction D1. The ADF method is a method in which the image sensor 60, statically staying under a scanning position SP on the feeding path R1 (see FIG. 3) extending from a feed tray 12 to a discharge tray 14, scans the document sheet DO being fed by the feeder 20.

As shown in FIG. 3, the feeder 20 includes feed rollers 71 and 72, conveyance rollers 73, 74, and 75, and discharge rollers 76 and 77. These rollers 71 to 77 are driven to rotate by the feed motor 30. The feed rollers 71 and 72 are disposed close to a downstream end portion of the feed tray 12 in a feeding direction D2 in which the document sheet DO is fed along the feeding path R1. The discharge rollers 76 and 77 are disposed close to the discharge tray 14. The conveyance rollers 73, 74, and 75 are disposed between the feed rollers 71 and 72 and the discharge rollers 76 and 77, along the feeding path R1. The feeder 20 further includes a plurality of guide members 81, 82, 83, 84, and 85.

The feed rollers 71 and 72 are configured to feed document sheets DO placed on the feed tray 12 downstream in the feeding direction D2 on a sheet-by-sheet basis. The conveyance rollers 73, 74, and 75 are configured to convey the document sheets DO fed from the feed tray 12 downstream along the feeding path R1 while turning around the feeding direction D2 of the document sheets DO along the guide members 81, 82, and 83. The aforementioned scanning position SP is a position on a backing portion BP disposed on a lower surface of the guide member 83. The document sheets DO, conveyed by the conveyance rollers 73, 74, and 75, pass through the scanning position SP. Then, the document sheets DO are conveyed to a position between the discharge rollers 76 and 77 while being guided along the guide members 84 and 85. Thereafter, the discharge rollers 76 and 77 discharge the document sheets DO onto the discharge tray 14. It is noted that in the illustrative embodiment, the color of the backing portion BP is white.

As shown in FIG. 3, the front sensor 40 is disposed close to the first reference position DP1 on the feeding path R1. The front sensor 40 includes a rotatable member 44 configured to rotate around a shaft 42. The rotatable member 44 is urged to partially protrude into the feeding path R1 from beneath the feeding path R1. Nonetheless, when there exists a document sheet DO in the first reference position DP1, the rotatable member 44 rotates around the shaft 42 into a state where the rotatable member 44 does not interfere with the feeding path R1. Thus, the front sensor 40 is configured to detect whether there exists a document sheet DO in the first reference position DP1, by detecting a state (e.g., a posture) of the rotatable member 44. The first reference position DP1 is set to such a position as to be substantially coincident with a leading end portion, in the feeding direction D2, of a document sheet DO placed on the feed tray 12. Therefore, the front sensor 40 is enabled to detect whether there is a document sheet DO placed on the feed tray 12.

The rear sensor 50 is disposed close to the second reference position DP2. The second reference position DP2 is located between a position where the conveyance rollers 74 and 75 pinch a document sheet DO therebetween and the scanning position SR The rear sensor 50 includes a rotatable member 54 configured to rotate around a shaft 52. The rotatable member 54 is urged to partially protrude into the feeding path R1 from above the feeding path R1. Nonetheless, when there exists a document sheet DO in the second reference position DP2, the rotatable member 54 rotates around the shaft 52 into a state where the rotatable member 54 does not interfere with the feeding path R1. Thus, the rear sensor 50 is configured to detect whether there exists a document sheet DO in the second reference position DP2, by detecting a state (e.g., a posture) of the rotatable member 54.

In the following description, a state of the front sensor 40 when the front sensor 40 detects a document sheet DO being in the first reference position DP1 will be referred to as an "ON state." Meanwhile, a state of the front sensor 40 when the front sensor 40 detects that there is no document sheet DO in the first reference position DP1 will be referred to as an "OFF state." The same applies to the rear sensor 50.

The controller 110 (see FIG. 1) includes a CPU 112, a storage 114, an application specific integrated circuit (hereinafter referred to as an "ASIC") 116. The controller 110 is configured to take overall control of the MFP 100. The storage 114 may include a ROM and a RAM. The storage 114 stores various programs 114A, and is configured to serve as a work area and/or a temporary storage area when the CPU 112 executes the programs 114A. The CPU 112 performs a specific process in accordance with one or more programs 114A read out from the storage 114. The ASIC 116 may include a hardware circuit for image processing. The controller 110 including the aforementioned elements is configured to implement various functions.

Figure 4:
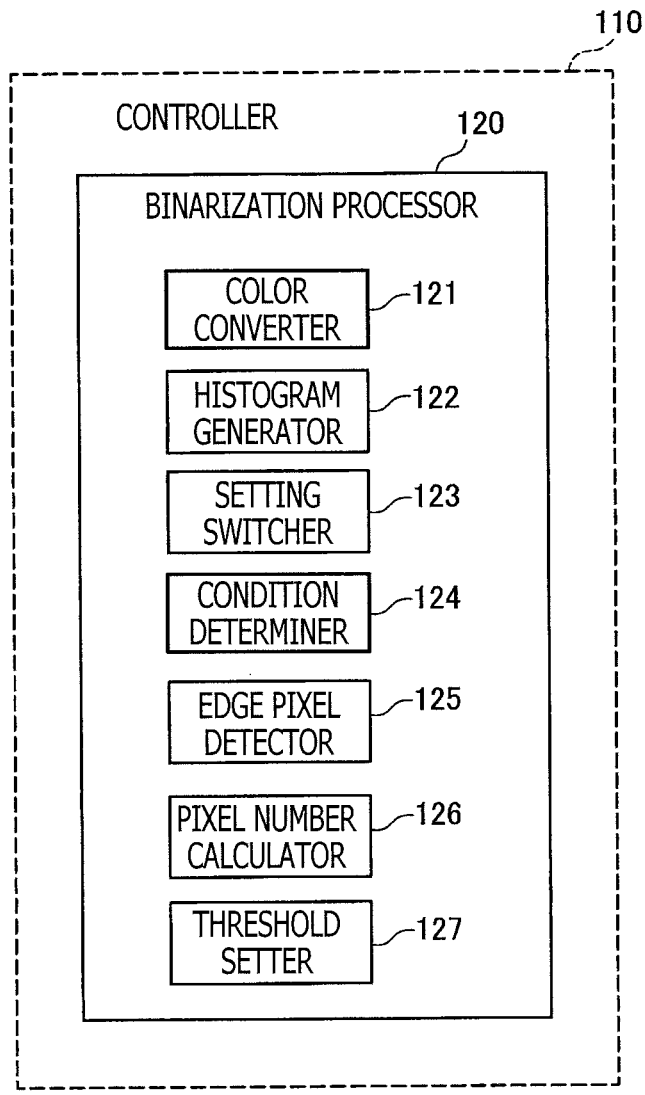
FIG. 4 is a block diagram exemplifying functions executable by a controller of the MFP in the illustrative embodiment according to one or more aspects of the present disclosure.

FIG. 4 is a block diagram exemplifying functions executable by the controller 110. The controller 110 is configured to serve as a binarization processor 120 performing a below-mentioned binary image data generating process. The binarization processor 120 includes a color converter 121, a histogram generator 122, a setting switcher 123, a condition determiner 124, an edge pixel detector 125, a pixel number calculator 126, and a threshold setter 127. Functions of the elements 121 to 127 will be described below.

1-2. Binary Image Data Generating Process

The MFP 100 of the illustrative embodiment is configured to perform a binary image data generating process. In the binary image data generating process, the MFP 100 scans a document sheet DO by the image scanner 170, thereby generating multi-level gradation image data (hereinafter referred to as "target image data Is") such as gradation image data having 256 levels for each color of RGB. Further, in the binary image data generating process, the MFP 100 compares a value of each pixel included in the target image data Is with a threshold, and based on the comparison result, converts each pixel into one of a white pixel having a gradation value representing white and a black pixel having a gradation value representing black. Thus, in the binary image data generating process, the MFP 100 generates binary image data Ib formed by the white pixels and the black pixels.

Figure 5:
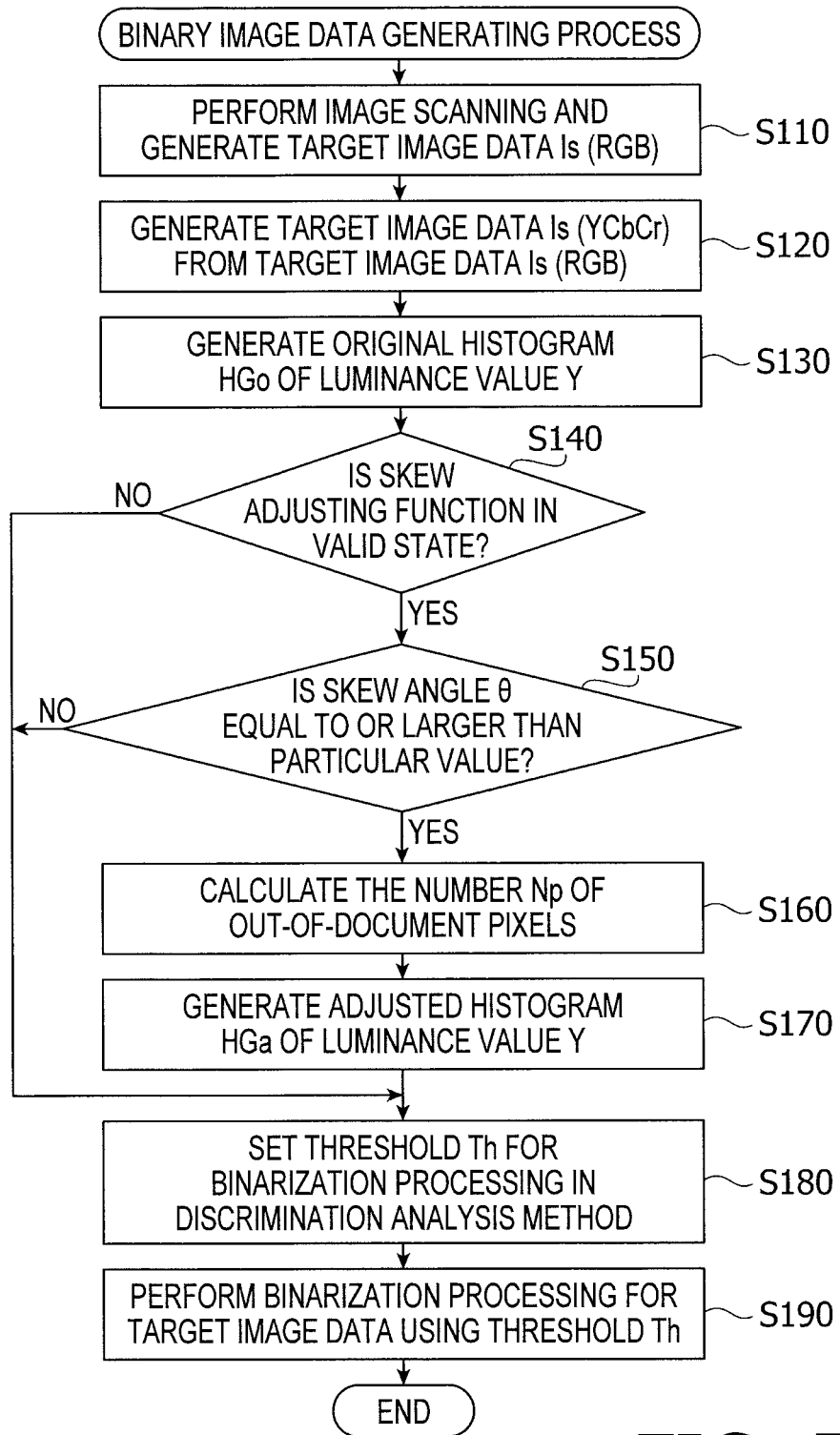
FIG. 5 is a flowchart showing a procedure of a binary image data generating process in the illustrative embodiment according to one or more aspects of the present disclosure.

FIG. 5 is a flowchart showing a procedure of the binary image data generating process of the illustrative embodiment. For instance, the controller 110 of the MFP 100 starts the binary image data generating process in response to detecting that a document sheet DO has been placed on the feed tray 12 by detecting that the state of the front sensor 40 has been changed from the OFF state to the ON state and detecting that an instruction to execute the binary image data generating process has been input via the operation I/F 130. In the illustrative embodiment, the instruction to execute the binary image data generating process includes a below-mentioned instruction to select a scanning mode and a below-mentioned instruction to select whether to set a skew adjusting function valid or invalid. The setting switcher 123 is configured to switch a setting state of the skew adjusting function between a valid state and an invalid state, in accordance with the instruction to select whether to set the skew adjusting function valid or invalid.

First, the controller 110 of the MFP 100 controls the image scanner 170 to scan the document sheet DO in the aforementioned ADF method, thereby generating the target image data Is (S110). In the illustrative embodiment, it is assumed that the target image data Is is so-called full-color RGB image data of which each pixel is expressed with 256 (8 bit) gradation values (0 to 255) for each of RGB components. In the following description, the gradation values of each pixel for the R component, the G component, and the B component may be simply referred to as "R," "G," and "B," respectively. The same may apply to a below-mentioned Y component, a below-mentioned Cb component, and a below-mentioned Cr component.

As shown in FIG. 6, the MFP 100 of the illustrative embodiment is configured to perform image scanning of the document sheet DO in three scanning modes, i.e., a first scanning mode M1, a second scanning mode M2, and a third scanning mode M3. The three scanning modes M1, M2, and M3 are different from each other with respect to whether a scanning area SA of the image sensor 60 is set on the basis of a position of the document sheet DO and whether a below-mentioned extended area EA is scanned. The first scanning mode M1 is a mode in which setting of the scanning area SA is on the basis of the position of the document sheet DO, and the extended area EA is not scanned. The second scanning mode M2 is a mode in which the setting of the scanning area SA is on the basis of the position of the document sheet DO, and the extended area EA is scanned. The third scanning mode M3 is a mode in which the setting of the scanning area SA is not on the basis of the position of the document sheet DO, and the extended area EA is not scanned. The controller 110 controls the image scanner 170 to perform image scanning of the document sheet DO in a specific one of the scanning modes M1 to M3 selected by the instruction to select the scanning mode that is included in the instruction to execute the binary image data generating process. Hereinafter, each of the scanning modes M1 to M3 will be described.

Figure 7:
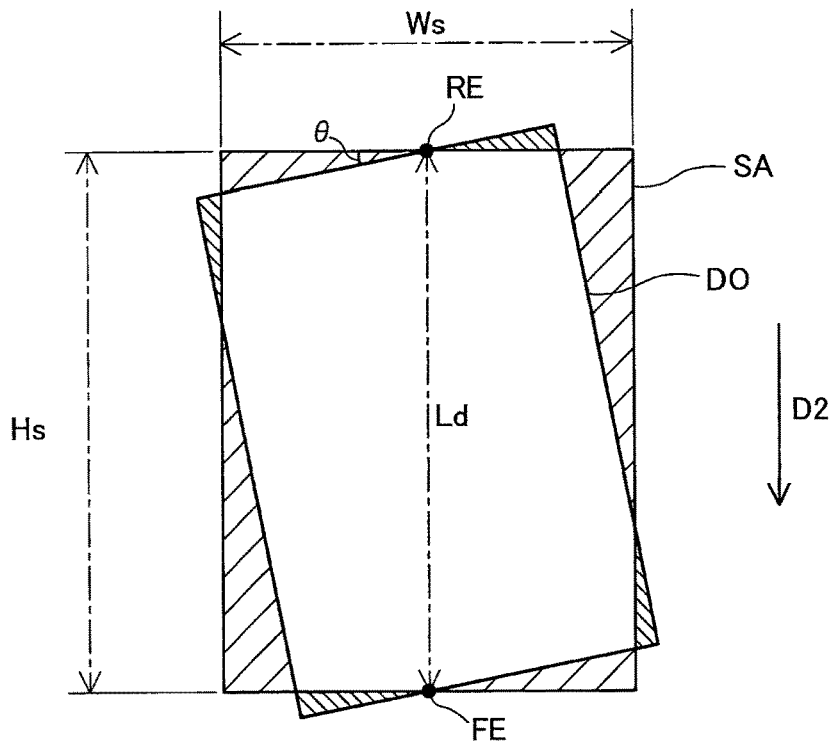
FIG. 7 is an illustration schematically showing how to scan a document sheet and generate target image data in the first scanning mode in the illustrative embodiment according to one or more aspects of the present disclosure.
Figure 7:
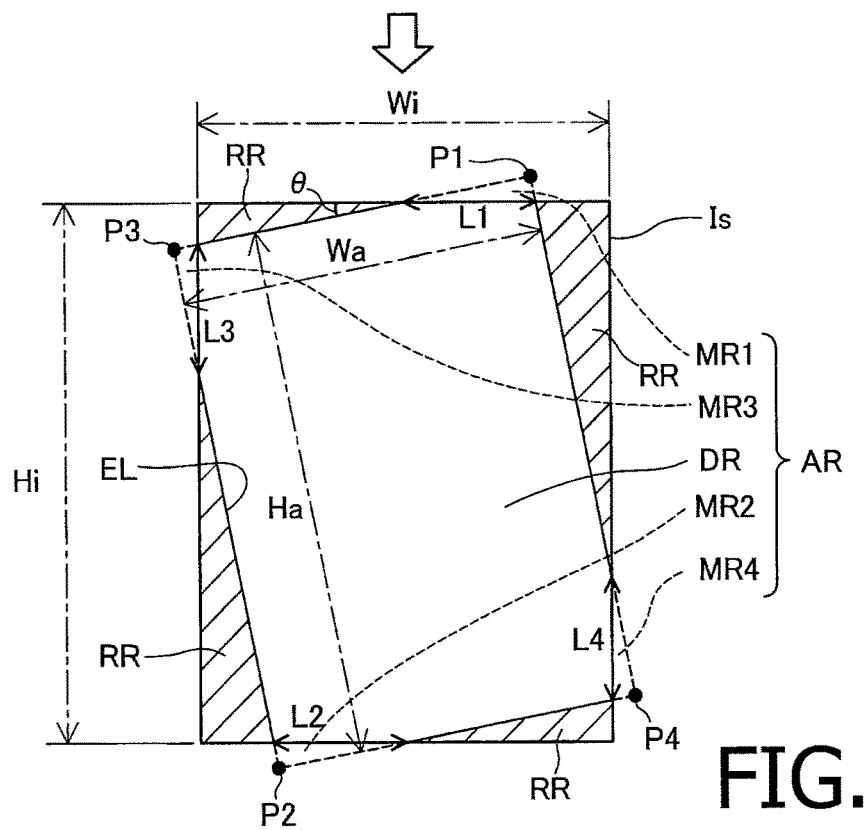

FIG. 7 is an illustration schematically showing how to scan the document sheet DO and generate the target image data Is in the first scanning mode M1. An upper section of FIG. 7 exemplifies a positional relationship between the document sheet DO being fed in the feeding direction D2 and the scanning area SA to be scanned by the image sensor 60, in the first scanning mode M1. A lower section of FIG. 7 exemplifies target image data Is to be generated in the first scanning mode M1. As shown in FIG. 7, in the image scanning of the document sheet DO, there may be a case in which an orientation of the document sheet DO is not coincident with a reference orientation. In the illustrative embodiment, the reference orientation is such an orientation that a leading end side or a trailing end side of a rectangular document sheet DO in the feeding direction is perpendicular to the feeding direction D2. Hereinafter, an angle θ at which the orientation of the document sheet DO is inclined relative to reference orientation in the image scanning may be referred to as a skew angle θ. The skew angle θ is more likely to be larger in ADF image scanning than in flatbed image scanning In the first scanning mode M1, after controlling the feeder 20 to start feeding the document sheet DO, the controller 110, while monitoring the state of the rear sensor 50, controls the image sensor 60 to start image scanning at a timing when a particular period of time has elapsed since the rear sensor 50 was brought into the ON state from the OFF state. It is noted that the when a front end point FE of the document sheet DO reaches the second reference position DP2 (see FIG. 3), the rear sensor 50 is brought into the ON state from the OFF state. The front end point FE is a leading end point of the document sheet DO in the feeding direction D2. The particular period of time is set to a period of time required for the document sheet DO to be conveyed from the second reference position DP2 to the scanning position SP. Therefore, a timing at which the image sensor 60 starts the image scanning of the document sheet DO is substantially the same as a timing at which the front end point FE of the document sheet DO reaches the scanning position SP.

Afterward, while monitoring the state of the rear sensor 50, the controller 110 controls the image sensor 60 to terminate the image scanning at a timing when the same particular period of time has elapsed since the rear sensor 50 was brought into the OFF state from the ON state. It is noted that when a rear end point RE of the document sheet DO passes through the second reference position DP2, the rear sensor 50 is brought into the OFF state from the ON state. The rear end point RE is a trailing end point of the document sheet DO in the feeding direction D2. Therefore, a timing at which the image sensor 60 terminates the image scanning of the document sheet DO is substantially the same as a timing at which the rear end point RE of the document sheet DO passes through the scanning position SP.

Thus, in the first scanning mode M1, the image sensor 60 starts the image scanning of the document sheet DO at the timing when the front end point FE of the document sheet DO reaches the scanning position SP, and terminates the image scanning of the document sheet DO at the timing when the rear end point RE of the document sheet DO passes through the scanning position SP. Therefore, a height Hs (i.e., a length in the feeding direction D2) of the scanning area SA to be scanned by the image sensor 60 is equal to a length Ld from the front end point FE to the rear end point RE of the document sheet DO. Further, a width Ws (i.e., a length in a width direction perpendicular to the feeding direction D2) of the scanning area SA to be scanned by the image sensor 60 is a width (e.g., a width of A4 size) previously set in accordance with a size (e.g., A4 size) of the document sheet DO. Hence, as shown in the upper section of FIG. 7, in the first scanning mode M1, when the orientation of the document sheet DO is not coincident with reference orientation during the image scanning, partial areas of the document sheet DO out of the scanning area SA are not scanned. Further, in partial areas of the scanning area SA that do not overlap the document sheet DO, the backing portion BP (see FIG. 3) is scanned.

Further, in the first scanning mode M1, an image in the scanning area SA is output as the target image data Is. Therefore, as shown in the lower section of FIG. 7, in the first scanning mode M1, when the orientation of the document sheet DO is not coincident with the reference orientation during the image scanning, the target image data Is includes out-of-document image areas RR as well as a document image area DR. The document image area DR represents a partial image of the document sheet DO. The out-of-document image areas RR represent images of the backing portion BP.

Figure 8:
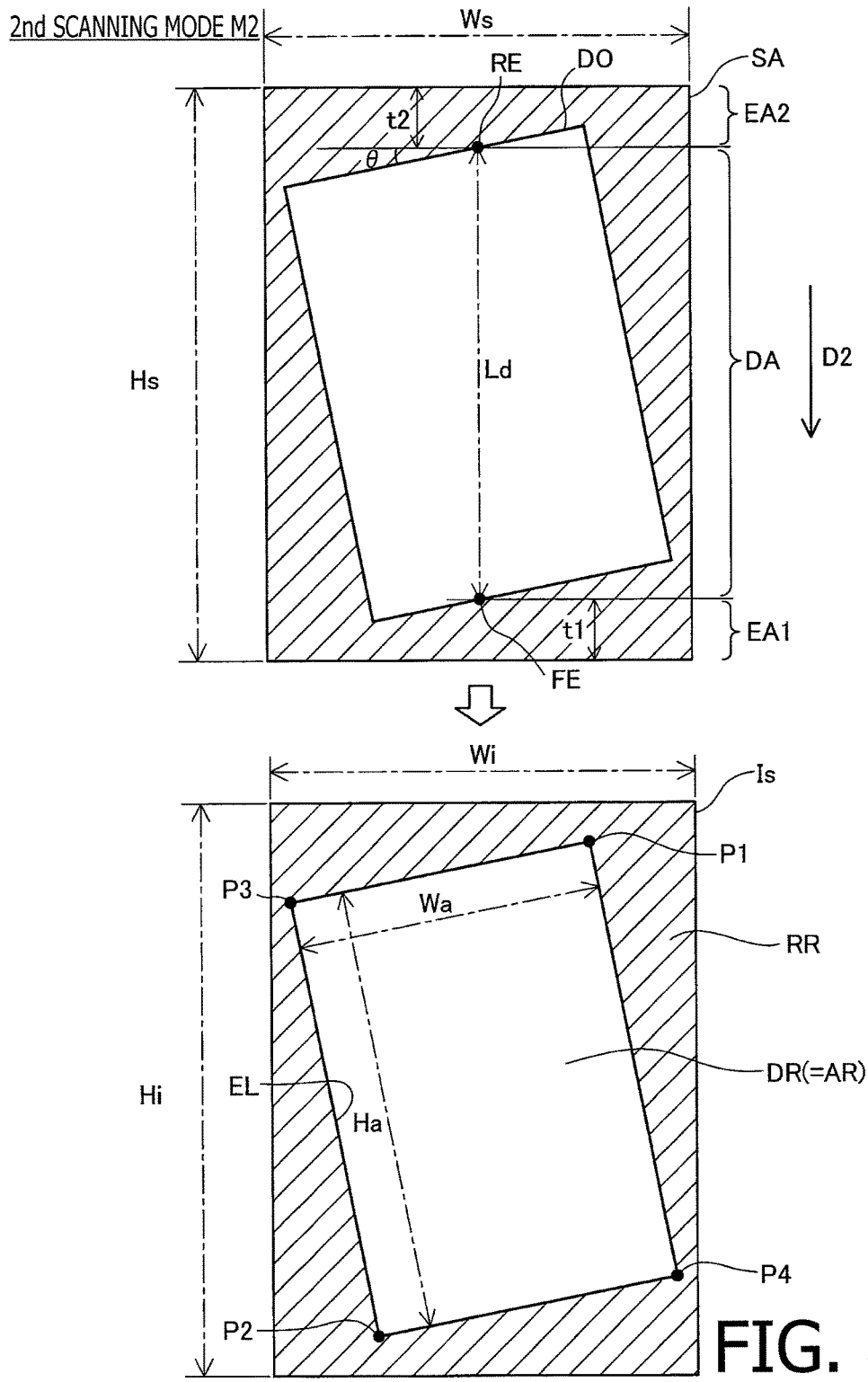
FIG. 8 is an illustration schematically showing how to scan the document sheet and generate the target image data in the second scanning mode in the illustrative embodiment according to one or more aspects of the present disclosure.

FIG. 8 is an illustration schematically showing how to scan the document sheet DO and generate the target image data Is in the second scanning mode M2. An upper section of FIG. 8 exemplifies a positional relationship between the document sheet DO being fed in the feeding direction D2 and a scanning area SA to be scanned by the image sensor 60, in the second scanning mode M2. A lower section of FIG. 8 exemplifies target image data Is to be generated in the second scanning mode M2. As described above, the second scanning mode M2 is a mode in which the extended area EA is scanned. As shown in the upper section of FIG. 8, the extended area EA may include one or two areas each adjacent to a corresponding end of a document corresponding area DA in the feeding direction D2. The document corresponding area DA is set based on a position of the document sheet DO detected by the rear sensor 50. In the example shown in the upper section of FIG. 8, the extended area EA includes a first extended area EA1 and a second extended area EA2. In this case, the first extended area EA1 is adjacent to a front end of the document corresponding area DA. The second extended area EA2 is adjacent to a rear end of the document corresponding area DA. A length t1 of the first extended area EA1 in the feeding direction D2 may be set to an arbitrary value based on a user instruction. Likewise, a length t2 of the second extended area EA2 in the feeding direction D2 may be set to an arbitrary value based on a user instruction.

In the second scanning mode M2, after controlling the feeder 20 to start feeding the document sheet DO, the controller 110, while monitoring the state of the rear sensor 50, controls the image sensor 60 to start image scanning at a timing when a first predetermined period of time has elapsed since the rear sensor 50 was brought into the ON state from the OFF state. The first predetermined period of time is set to a period of time required for the document sheet DO to be conveyed from the second reference position DP2 to a position that is located the length t1 (of the first extended area EA1) upstream of the scanning position SP in the feeding direction D2. Therefore, a timing at which the image sensor 60 starts the image scanning of the document sheet DO is substantially the same as a timing at which the front end point FE of the document sheet DO reaches the position that is the length t1 upstream of the scanning position SP in the feeding direction D2.

Afterward, while monitoring the state of the rear sensor 50, the controller 110 controls the image sensor 60 to terminate the image scanning at a timing when a second predetermined period of time has elapsed since the rear sensor 50 was brought into the OFF state from the ON state. The second predetermined period of time is set to a period of time required for the document sheet DO to be conveyed from the second reference position DP2 to a position that is located the length t2 (of the second extended area EA2) downstream of the scanning position SP in the feeding direction D2. Therefore, a timing at which the image sensor 60 terminates the image scanning of the document sheet DO is substantially the same as a timing at which the rear end point RE of the document sheet DO passes through the position that is the length t2 downstream of the scanning position SP in the feeding direction D2.

Thus, in the second scanning mode M2, the image sensor 60 starts the image scanning of the document sheet DO at the timing when the front end point FE of the document sheet DO reaches the position that is the length t1 upstream of the scanning position SP in the feeding direction D2, and terminates the image scanning of the document sheet DO at the timing when the rear end point RE of the document sheet DO passes through the position that is the length t2 downstream of the scanning position SP in the feeding direction D2. Therefore, a height Hs (i.e., a length in the feeding direction D2) of the scanning area SA to be scanned by the image sensor 60 is equal to a value obtained by adding the length t1 of the first extended area EA1 and the length t2 of the second extended area EA2 to the length Ld from the front end point FE to the rear end point RE of the document sheet DO. Further, a width Ws (i.e., a length in the width direction perpendicular to the feeding direction D2) of the scanning area SA to be scanned by the image sensor 60 is a width (e.g., a width wider by a particular length than the width of A4 size) previously set in accordance with the size (e.g., A4 size) of the document sheet DO. In the second scanning mode M2, the scanning area SA always includes an area that does not overlap the document sheet DO. In such an area of the scanning area SA that does not overlap the document sheet DO, the image sensor 60 scans the backing portion BP (see FIG. 3) instead of scanning the document sheet DO. It is noted that in the second scanning mode M2, depending on a relationship among the skew angle θ, the length t1 of the first extended area EA1, and the length t2 of the second extended area EA2, a partial area of the document sheet DO may be out of the scanning area SA in the same manner as in the first scanning mode M1 shown in FIG. 7.

Further, in the second scanning mode M2, an image in the scanning area SA is output as the target image data Is. Therefore, as shown in the lower section of FIG. 8, in the second scanning mode M2, the target image data Is includes an out-of-document image area RR as well as a document image area DR. The document image area DR represents a part or a whole of the document sheet DO. The out-of-document image area RR represents an image of the backing portion BR An image scanning process in the second scanning mode M2 is an extended image scanning process to scan the scanning area SA including the document corresponding area DA, the first extended area EA1, and the second extended area EA2. As described above, the document corresponding area DA is set based on the position of the document sheet DO. The first extended area EA1 has the length t1 in the feeding direction D2 and is adjacent to the document corresponding area DA. The second extended area EA2 has the length t2 in the feeding direction D2 and is adjacent to the document corresponding area DA.

Figure 9:
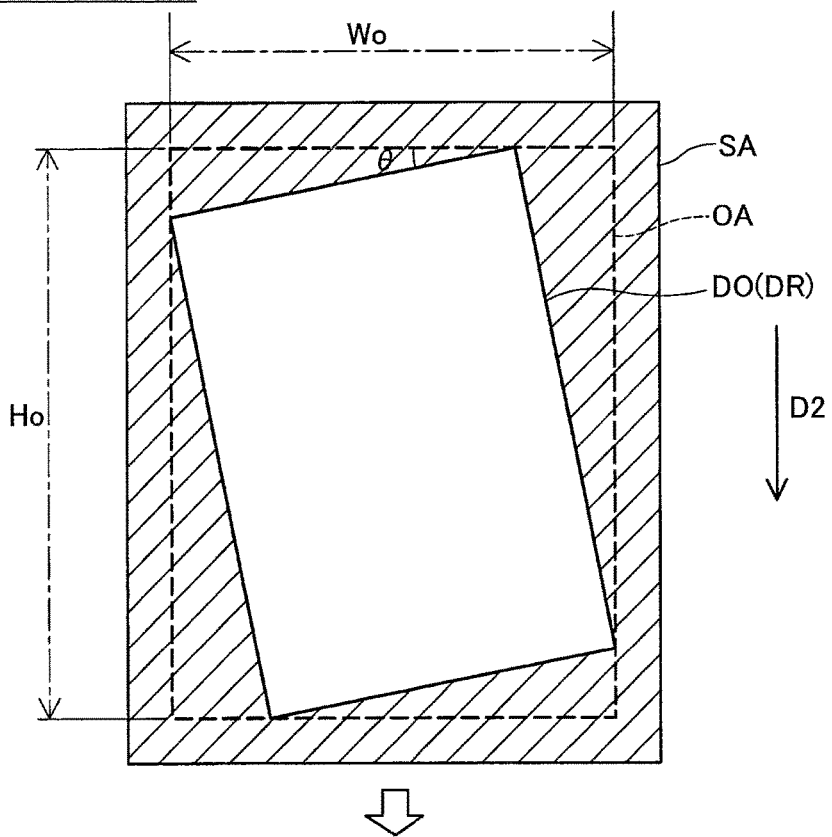
FIG. 9 is an illustration schematically showing how to scan the document sheet and generate the target image data in the third scanning mode in the illustrative embodiment according to one or more aspects of the present disclosure.
Figure 9:
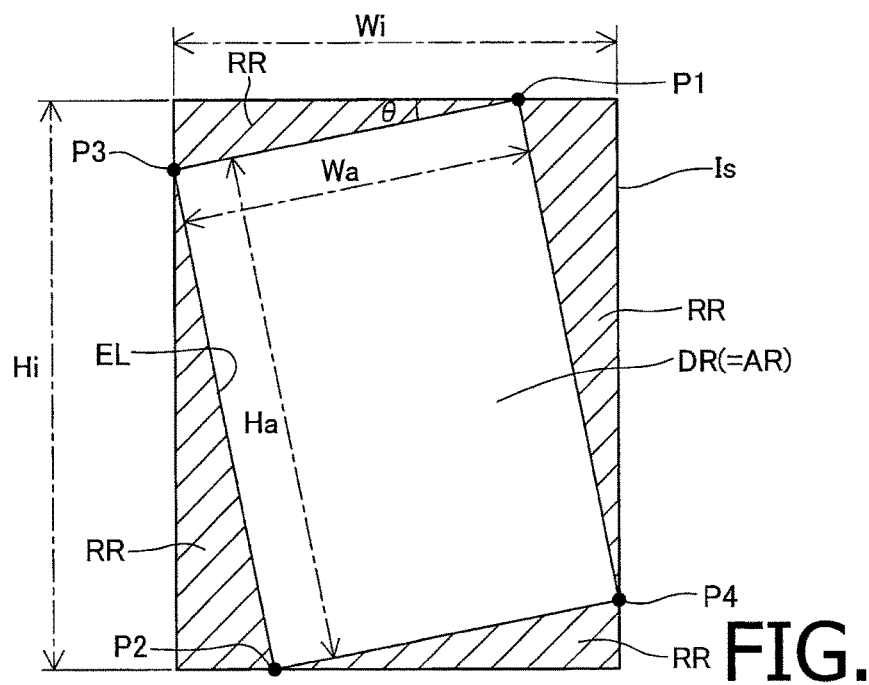

FIG. 9 is an illustration schematically showing how to scan the document sheet DO and generate the target image data Is in the third scanning mode M3. An upper section of FIG. 9 exemplifies a positional relationship between the document sheet DO being fed in the feeding direction D2 and a scanning area SA to be scanned by the image sensor 60, in the third scanning mode M3. A lower section of FIG. 9 exemplifies target image data Is to be generated in the third scanning mode M3. As described above, the third scanning mode M3 is a mode in which the setting of the scanning area SA is not on the basis of the position of the document sheet DO. More specifically, the third scanning mode M3 is a mode to generate the target image data Is that represents a minimum rectangular area encompassing a whole image of the document sheet DO, by setting the scanning area SA to be large enough to entirely encompass the document sheet DO regardless of the skew angle θ and trimming the area(s) other than the minimum rectangular area encompassing the whole image of the document sheet DO in original image data generated by scanning the scanning area SA.

In the third scanning mode M3, after controlling the feeder 20 to start feeding the document sheet DO, the controller 110 controls the image sensor 60 to start image scanning at a timing early enough for the scanning area SA to encompass the document sheet DO. Afterward, the controller 110 controls the image sensor 60 to terminate the image scanning at a timing late enough for the scanning area SA to encompass the document sheet DO.

Further, in the third scanning mode M3, the controller 110 performs image processing for image data generated by scanning the scanning area SA, thereby detecting a document image area DR representing the whole image of the document sheet DO and generating the target image data Is that represents an image in an output area OA defined by a height Ho and a width Wo. The output area OA is set as a minimum rectangular area encompassing the document image area DR. Therefore, as shown in the lower section of FIG. 9, in the third scanning mode M3, the target image data Is represents an image including the document image area DR corresponding to a whole image of the document sheet DO. Furthermore, when the orientation of the document sheet DO is not coincident with the reference orientation during the image scanning, the target image data Is includes out-of-document image areas RR as well as the document image area DR. The out-of-document image areas RR represent images of the backing portion BP.

Referring back to FIG. 5, a continued explanation of the binary image data generating process will be provided. When the generation of the target image data Is (RGB data) is completed, the color converter 121 (see FIG. 1) generates target image data Is (YCbCr data) from the target image data Is (RGB data) (S120). The YCbCr data is image data that expresses a color of each pixel with a luminance value (a luminance component) Y and two chromaticity values (chromaticity components) Cb (yellow-blue) and Cr (red-green). For instance, the process to generate the target image data Is (YCbCr data) from the target image data Is (RGB data) may be performed using the following expressions (1) to (3). In the illustrative embodiment, the luminance value Y is expressed with 256 gradation levels from 0 to 255. Each of the chromaticity values Cb and Cr is expressed with 256 gradation levels from −127 to 128.

$$Y=0.2999R+0.587G+0.114B \quad (1)$$

$$Cb=-0.169R-0.331G+0.500B \quad (2)$$

$$Cr=0.500R-0.419G-0.081B \quad (3)$$

Figure 10:
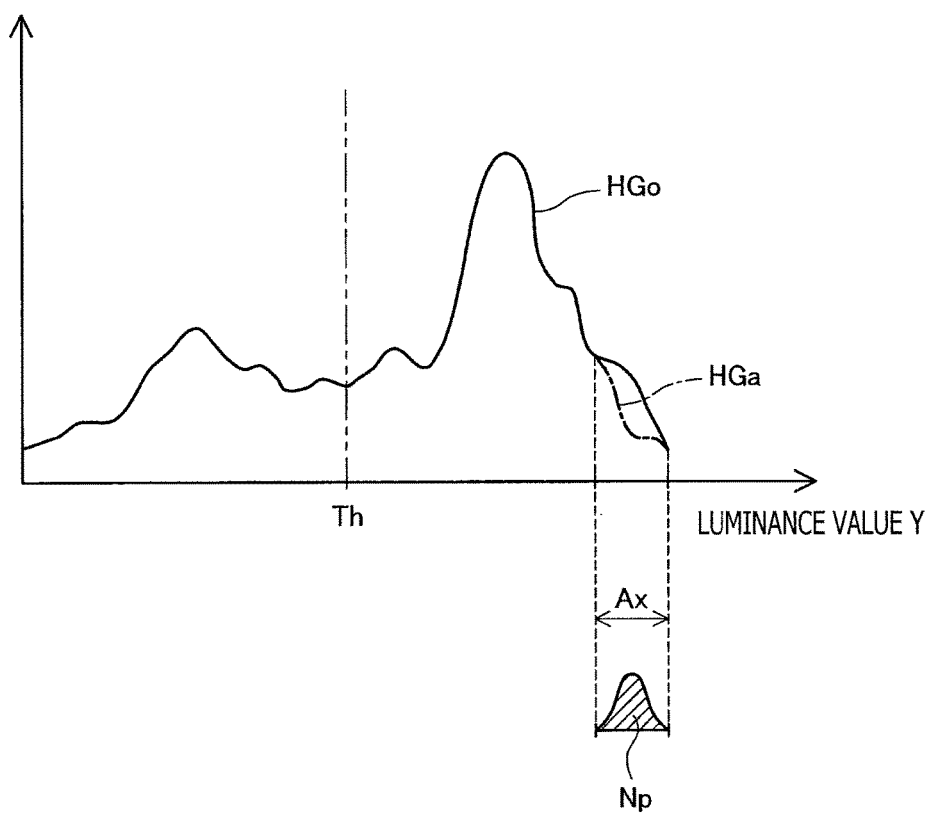
FIG. 10 is an illustration schematically showing how to generate an adjusted histogram from an original histogram of luminance values of the target image data, in the illustrative embodiment according to one or more aspects of the present disclosure.

Subsequently, the histogram generator 122 of the controller 110 generates an original histogram HGo of the luminance values Y of the target image data Is (S130). FIG. 10 shows an example of the original histogram HGo of the luminance values Y of the target image data Is. The original histogram HGo exemplified in FIG. 10 shows a curve connecting respective frequencies of the luminance values Y. When the target image data Is includes the out-of-document areas RR, the original histogram HGo reflects frequencies of luminance values Y of pixels included in the out-of-document areas RR. Therefore, in this case, the original histogram HGo is different from a frequency distribution of luminance values Y of only pixels included in the document image area DR.

Next, the condition determiner 124 of the controller 110 determines whether the skew adjusting function is set valid in the instruction to execute the binary image data generating process (S140). As will be described later, the skew adjusting function is a function to generate an adjusted histogram HGa by adjusting the original histogram HGo and set a threshold Th based on the adjusted histogram Hga. When determining that the skew adjusting function is not set valid (i.e., the skew adjusting function is set invalid) (S140: No), the controller 110 goes to S180.

Meanwhile, when determining that the skew adjusting function is set valid (S140: Yes), the condition determiner 124 determines whether the skew angle θ is equal to or larger than a particular value (S150). In any mode of the first to third scanning modes M1 to M3, the larger the skew angle θ is, the larger a total area of the out-of-document image area(s) RR included in the target image data Is is. Therefore, the determination in S150 is substantially equivalent to determining whether the total area of the out-of-document image area(s) RR included in the target image data Is is equal to or larger than a certain extent of area. For the determination in S150, the edge pixel detector 125 of the controller 110 detects positions of edge pixels representing edges of the document sheet DO by image processing for the target image data Is, identifies edge lines EL that are aggregations of edge pixels (see FIGS. 7 to 9), and calculates the skew angle θ by determining inclinations of the edge lines EL. When determining that the skew angle θ is smaller than the particular value (S150: No), the controller 110 goes to S180. Meanwhile, When determining that the skew angle θ is equal to or larger than the particular value (S150: Yes), the controller 110 goes to S160.

Thus, in the binary image data generating process of the illustrative embodiment, when it is determined that the skew adjusting function is set valid (S140: Yes) and that the skew angle θ is equal to or larger than the particular value (S150: Yes, i.e., the total area of the out-of-document image area(s) RR included in the target image data Is is equal to or larger than a certain extent of area), the following steps S160 and S170 are executed. Meanwhile, when it is determined that the skew adjusting function is set invalid (S140: No) or that the skew angle θ is smaller than the particular value (S150: No), the steps S160 and S170 are skipped.

In S160, the pixel number calculator 126 calculates the number Np of the out-of-document pixels of a plurality of pixels included in the target image data Is. The out-of-document pixels are pixels forming the out-of-document image area(s) RR, other than pixels that express the document sheet DO and form the document image area DR. As shown in FIGS. 7 to 9, the total area of the out-of-document image area(s) RR and the number Np of the out-of-document pixels differ depending on the scanning mode and the skew angle θ. Therefore, the pixel number calculator 126 calculates the number Np of the out-of-document pixels based on the scanning mode and the skew angle θ.

Referring to FIG. 7, an explanation will be provided about how to calculate the number Np of the out-of-document pixels when image scanning is performed in the first scanning mode M1. First, by image processing for the target image data Is, the pixel number calculator 126 identifies the edge lines EL that are aggregations of edge pixels, and identifies respective positions of vertices P1 to P4 of a whole document area AR corresponding to a whole area of the document sheet DO, based on the identified edge lines EL. Further, based on the identified positions of the vertices P1 to P4, the pixel number calculator 126 calculates a width Wa and a height Ha of the whole document area AR. Then, the pixel number calculator 126 calculates an area Xa of the whole document area AR in accordance with the following expression (4).

$$Xa = Wa \times Ha \tag{4}$$

Further, with respect to exclusion areas MR1 to MR4 that are included in the whole document area AR but are not included in an image area of the target image data Is, the pixel number calculator 126 determines, via image processing, lengths L1 to L4 of boundary lines each of which is between a corresponding one of the exclusion areas MR1 to MR4 and the image area of the target image data Is. Then, the pixel number calculator 126 calculates areas Xm (Xm1 to Xm4) of the exclusion areas MR1 to MR4 in accordance with the following expressions (5) to (8) using the skew angle θ, respectively.

$$Xm1 = (L1 \times \sin\theta) \times (L1 \times \cos\theta) \times \tfrac{1}{2} \tag{5}$$

$$Xm2 = (L2 \times \sin\theta) \times (L2 \times \cos\theta) \times \tfrac{1}{2} \tag{6}$$

$$Xm3 = (L3 \times \sin\theta) \times (L3 \times \cos\theta) \times \tfrac{1}{2} \tag{7}$$

$$Xm4 = (L4 \times \sin\theta) \times (L4 \times \cos\theta) \times \tfrac{1}{2} \tag{8}$$

Then, the pixel number calculator 126 calculates an area Xd of the document image area DR in accordance with the following expression (9).

$$Xd = Xa - (Xm1 + Xm2 + Xm3 + Xm4) \tag{9}$$

Further, the pixel number calculator 126 determines a height Hi and a width Wi of the image area of the target image data Is, and calculates an area Xi of the image area of the target image data Is in accordance with the following expression (10). The height Hi of the image area of the target image data Is corresponds to the length Ld, in the feeding direction D2, of the scanning area SA to be scanned by the image sensor 60. The width Wi of the image area of the target image data Is corresponds to the width Ws of the scanning area SA to be scanned by the image sensor 60.

$$Xi = Wi \times Hi \tag{10}$$

Then, the pixel number calculator 126 calculates an area Xr of the out-of-document image areas RR in accordance with the following expression (11). The area Xr is the total area of the out-of-document image areas RR.

$$Xr = Xi - Xd \tag{11}$$

Finally, the pixel number calculator 126 calculates the number Np of the out-of-document pixels forming the out-of-document image areas RR, in accordance with the following expression (12) using a resolution (i.e., the number of pixels per unit area) Rx of the target image data Is.

$$Np = Xr \times Rx \tag{12}$$

Next, referring to FIG. 8, an explanation will be provided about how to calculate the number Np of the out-of-document pixels when image scanning is performed in the second scanning mode M2. First, in the same manner as when image scanning is performed in the first scanning mode M1, by image processing for the target image data Is, the pixel number calculator 126 identifies the edge lines EL, and identifies respective positions of vertices P1 to P4 of the document image area DR based on the identified edge lines EL. In the example shown in FIG. 8, the document image area DR is identical to the whole document area AR. Further, based on the identified positions of the vertices P1 to P4, the pixel number calculator 126 calculates the width Wa and the height Ha of the whole document area AR. Then, the pixel number calculator 126 calculates the area Xa of the whole document area AR in accordance with the above expression (4).

Further, the pixel number calculator 126 calculates the area Xi of the image area of the target image data Is in accordance with the above expression (10). The height Hi of the image area of the target image data Is corresponds to a height resulting from adding the lengths t1 and t2 of the extended area EA to the length Ld of the scanning area SA in the feeding direction D2. Thus, when image scanning is performed in the second scanning mode M2, the pixel number calculator 126 refers to a size (i.e., dimensions) of the extended area EA to calculate the number Np of the out-of-document pixels. Further, the width Wi of the target image data Is corresponds to the width Ws of the scanning area SA to be scanned by the image sensor 60.

Then, the pixel number calculator 126 calculates an area Xr (i.e., the total area) of the out-of-document image area RR in accordance with the following expression (13).

$$Xr = Xi - Xa \tag{13}$$

Finally, the pixel number calculator 126 calculates the number Np of the out-of-document pixels forming the out-of-document area RR in accordance with the above expression (12).

In the example shown in FIG. 8, the whole document area AR is identical to the document image area DR. However, depending on the skew angle θ and the lengths t1 and t2 of the extended area EA, the whole document area AR may be larger than the document image area DR in the same manner as when image scanning is performed in the first scanning mode M1. In such a case, in the same manner as when image scanning is performed in the first scanning mode M1, the pixel number calculator 126 may calculate the areas Xm1 to Xm4 of the exclusion areas MR1 to MR4 in accordance with the above expressions (5) to (8), respectively. Then, the pixel number calculator 126 may calculate the area Xd of the document image area DR by subtracting the areas Xm1 to Xm4 of the exclusion areas MR1 to MR4 from the whole document area AR in accordance with the above expression (9).

Subsequently, referring to FIG. 9, an explanation will be provided about how to calculate the number Np of the out-of-document pixels when image scanning is performed in the third scanning mode M3. It is noted that in the third scanning mode M3, the document image area DR is always identical to the whole document area AR. First, in the same manner as when image scanning is performed in the first scanning mode M1, by image processing for the target image data Is, the pixel number calculator 126 identifies the edge lines EL, and identifies respective positions of vertices P1 to P4 of the document image area DR (i.e., the whole document area AR) based on the identified edge lines EL. Further, based on the identified positions of the vertices P1 to P4, the pixel number calculator 126 calculates the width Wa and the height Ha of the whole document area AR. Then, the pixel number calculator 126 calculates the area Xa of the whole document area AR in accordance with the above expression (4).

Further, the pixel number calculator 126 calculates the area Xi of the image area of the target image data Is in accordance with the above expression (10). Then, the pixel number calculator 126 calculates the area Xr (i.e., the total area) of the out-of-document image areas RR in accordance with the above expression (13).

Finally, the pixel number calculator 126 calculates the number Np of the out-of-document pixels forming the out-of-document areas RR in accordance with the above expression (12).

Referring back to FIG. 5, a continued explanation of the binary image data generating process will be provided. After the calculation of the number Np of the out-of-document pixels in S160 is completed, the histogram generator 122 of the controller 110 adjusts the original histogram HGo, thereby generating the adjusted histogram HGa (S170). Specifically, as shown in FIG. 10, the histogram generator 122 generates the adjusted histogram HGa by reducing frequencies within a particular range (hereinafter referred to as an "adjustment range Ax") of the luminance value Y in the original histogram HGo by the number Np of the out-of-document pixels. Namely, the adjusted histogram HGa is identical to the original histogram HGo within a range other than the adjustment range Ax. As indicated by an alternate long and short dash line in FIG. 10, the adjusted histogram HGa is different from the original histogram HGo within the adjustment range Ax.

In the illustrative embodiment, the adjustment range Ax is a particular range that is previously determined to include a maximum value of the luminance value Y. As described above, in the illustrative embodiment, the backing portion BP is white. Therefore, a color of each out-of-document pixel included in the out-of-document image area(s) RR of the target image data Is is highly likely to be white or a color substantially equivalent to white. Hence, the adjustment range Ax is set to include the maximum value of the luminance value Y, and the adjusted histogram HGa is generated by reducing the frequencies of the luminance values Y within the adjustment range Ax by the number Np of the out-of-document pixels. Thus, the adjusted histogram HGa generated as above is more closely similar to a frequency distribution of the luminance values Y of the pixels (i.e., the pixels forming the document image area DR) representing the document sheet DO than the original histogram HGo.

Further, in the illustrative embodiment, the histogram generator 122 apportions the number Np of the out-of-document pixels among the luminance values Y within the adjustment range Ax in accordance with a normal distribution. Then, the histogram generator 122 subtracts, from the frequency of each of the luminance values Y within the adjustment range Ax in the original histogram HGo, a corresponding number of out-of-document pixels allocated to each luminance value Y. Thereby, the histogram generator 122 generates the adjusted histogram HGa. In the illustrative embodiment, the backing portion BP is white. Nonetheless, the luminance value Y of every out-of-document pixel may not necessarily be the maximum value. Rather, because of color unevenness of the backing portion BP and/or sensitivity unevenness of the image sensor 60, the luminance values Y of the out-of-document pixels are considered to be distributed substantially in accordance with the normal distribution within the adjustment range Ax. Therefore, the adjusted histogram HGa, which is generated by allocating the number Np of the out-of-document pixels to each luminance value Y within the adjustment range Ax in accordance with the normal distribution, is further closely similar to the frequency distribution of the luminance values Y of the pixels representing the document sheet DO (i.e., the pixels forming the document image area DR).

In S180, the threshold setter 127 of the controller 110 sets a threshold Th of the luminance value Y for binarization processing, based on the histogram of the luminance value Y generated by the histogram generator 122 (S180). It is noted that the histogram of the luminance value Y generated by the histogram generator 122 denotes the adjusted histogram HGa when the generation of the adjusted histogram HGa in S170 is performed. Meanwhile, the histogram of the luminance value Y generated by the histogram generator 122 denotes the original histogram HGo when the generation of the adjusted histogram HGa in S170 is not performed.

For instance, the threshold Th of the luminance value Y for binarization processing may be set in a discrimination analysis method (i.e., Otsu's method). The discrimination analysis method is a method to, while changing a threshold A from a minimum value to the maximum value in the histogram of the luminance values Y, find and set the threshold A that maximizes a ratio of a between-class variance to a within-class variance of two classes of pixels separated by the threshold A, as the threshold Th for the binarization processing. FIG. 10 exemplifies the set threshold Th.

Next, the binarization processor 120 generates binary image data Ib by performing binarization processing for the target image data Is on the basis of the set threshold Th (S190). Specifically, the binarization processor 120 converts pixels having luminance values Y equal to or lower than the threshold Th, among the pixels included in the target image data Is, into black pixels. Further, the binarization processor 120 converts pixels having luminance values Y higher than the threshold Th, among the pixels included in the target image data Is, into white pixels. Namely, in the original histogram HGo of the luminance value Y shown in FIG. 10, left pixels relative to the threshold Th are converted into black pixels, while right pixels relative to the threshold Th are converted into white pixels. In the illustrative embodiment, the binary image data Ib is generated as RGB image data. Therefore, RGB gradation values (R, G, B) of each black pixel are (0, 0, 0). Further, RGB gradation values (R, G, B) of each white pixel are (255, 255, 255).

As described above, the MFP 100 of the illustrative embodiment includes the histogram generator 122 configured to generate the histogram of the luminance values Y of the pixels forming the target image data Is generated by image scanning of the document sheet DO. Further, the MFP 100 includes the threshold setter 127 configured to set the threshold Th of the luminance value Y for binarization processing, based on the histogram generated by the histogram generator 122. Further, the MFP 100 includes the binarization processor 120 configured to perform binarization processing for the target image data Is on the basis of the threshold Th. When the skew angle θ that represents an angle difference between the orientation of the document sheet DO and the reference orientation in the image scanning is equal to or larger than the particular value, the pixels forming the target image data Is include the out-of-document pixels. The out-of-document pixels are pixels other than the pixels representing the document sheet DO, and are the pixels forming the out-of-document image area(s) RR shown in FIGS. 7 to 9. Therefore, in this case, when the threshold Th for binarization processing is set based on the original histogram HGo of the luminance values Y of all the pixels included in the target image data Is, luminance values Y of the out-of-document pixels have some influences on the set threshold Th. Thus, in this case, since the original histogram HGo does not accurately reflect an actual image of the document sheet DO, the threshold Th set based on the original histogram HGo might not be an appropriate threshold for the actual image of the document sheet DO. Consequently, it might be impossible to perform appropriate binarization processing to generate appropriate binary image data of the document sheet DO. Nonetheless, the MFP 100 of the illustrative embodiment further includes the condition determiner 124 configured to determine whether particular condition is satisfied that includes a requirement that the skew angle θ (i.e., the angle difference between the orientation of the document sheet DO and the reference orientation in the image scanning) is equal to or larger than the particular value (see S150 in FIG. 5). The MFP 100 of the illustrative embodiment further includes the pixel number calculator 126 configured to calculate the number Np of the out-of-document pixels of the pixels forming the target image data Is. Then, when the condition determiner 124 determines that the aforementioned particular condition is satisfied, the histogram generator 122 generates the adjusted histogram HGa (see FIG. 10) by subtracting the number Np of the out-of-document pixels from the frequencies of the luminance values Y within the adjustment range Ax in the original histogram HGo. The adjusted histogram HGa generated as above is more closely similar to the frequency distribution of the luminance values Y of the pixels (i.e., the pixels forming the document image area DR in FIGS. 7 to 9) representing the document sheet DO than the original histogram HGo. Thus, according to the illustrative embodiment, the MFP 100 is configured to, when the skew angle θ is equal to or larger than the particular value, set the threshold Th of the luminance values Y for the binarization processing, based on the adjusted histogram HGa. Hence, according to the illustrative embodiment, the MFP 100 is enabled to set the threshold Th to be appropriate for the actual image of the document sheet DO and perform appropriate binarization processing using the appropriate threshold Th.

Further, in the MFP 100 of the illustrative embodiment, the pixel number calculator 126 calculates the number Np of the out-of-document pixels based on the skew angle θ (i.e., the angle difference between the orientation of the document sheet DO and the reference orientation in the image scanning). Therefore, the MFP 100 of the illustrative embodiment is capable of easily and accurately calculating the number Np of the out-of-document pixels caused by the skew angle θ. Consequently, it is possible to easily and accurately generate the adjusted histogram HGa.

Further, in the MFP 100 of the illustrative embodiment, the histogram generator 122 apportions the number Np of the out-of-document pixels among the luminance values Y within the adjustment range Ax in accordance with the normal distribution, and subtracts, from the frequency of each of the luminance values Y within the adjustment range Ax in the original histogram HGo, a corresponding number of out-of-document pixels allocated to each luminance value Y. Thereby, the histogram generator 122 generates the adjusted histogram HGa (see FIG. 10). Therefore, according to the MFP 100 of the illustrative embodiment, it is possible to render the adjusted histogram HGa further closely similar to the frequency distribution of the luminance values Y of the pixels (i.e., the pixels forming the document image area DR in FIGS. 7 to 9) representing the document sheet DO. Consequently, it is possible to set the threshold Th to be further appropriate for the actual image of the document sheet DO and perform further appropriate binarization processing.

Further, the MFP 100 of the illustrative embodiment includes the image scanner 170 configured to perform image scanning of the scanning area SA and generate the target image data Is. Therefore, according to the illustrative embodiment, regardless of the skew angle θ (i.e., the angle difference between the orientation of the document sheet DO and the reference orientation in the image scanning), the MFP 100 is enabled to set the threshold Th to be appropriate for the actual image of the document sheet DO and perform appropriate binarization processing using the appropriate threshold Th, for the target image data Is generated by the image scanner 170.

Further, the MFP 100 of the illustrative embodiment includes the rear sensor 50 configured to identify the position of the document sheet DO. In the second scanning mode M2 (see FIG. 8), the image scanner 170 performs the extended image scanning process to scan the scanning area SA including the document corresponding area DA, the first extended area EA1, and the second extended area EA2. The document corresponding area DA is set based on the identified position of the document sheet DO. The first extended area EA1 has the length t1 in the feeding direction D2 and is adjacent to the document corresponding area DA. The second extended area EA2 has the length t2 in the feeding direction D2 and is adjacent to the document corresponding area DA. When the image scanner 170 performs the extended image scanning process, the pixel number calculator 126 calculates the number Np of the out-of-document pixels based on the lengths t1 of the first extended area EA1 and the lengths t2 of the second extended area EA2. The pixels, forming the target image data Is generated by the image scanner 170 in the extended image scanning process, include the out-of-document pixels at a particular rate or more. In the MFP 100 of the illustrative embodiment, when the image scanner 170 performs the extended image scanning process, the pixel number calculator 126 calculates the number Np of the out-of-document pixels. Therefore, it is possible to easily and accurately calculate the number Np of the out-of-document pixels. Consequently, it is possible to easily and accurately generate the adjusted histogram HGa. Thus, it is possible to set the threshold Th to be appropriate for the actual image of the document sheet DO and perform appropriate binarization processing using the appropriate threshold Th.

Further, according to the illustrative embodiment, in the third scanning mode M3 (see FIG. 9), the image scanner 170 performs image scanning of the scanning area SA and generates the original image data (i.e., the image data of the scanning area SA). Further, the image scanner 170 generates the target image data Is by trimming the area(s) other than the minimum rectangular area encompassing the whole image of the document sheet DO in the original image data. Therefore, according to the illustrative embodiment, the MFP 100 is enabled to always generate the target image data Is encompassing the whole image of the document sheet DO, set the threshold Th to be appropriate for the actual image of the document sheet DO based on the target image data Is, and perform appropriate binarization processing using the appropriate threshold Th.

Further, the MFP 100 of the illustrative embodiment includes the setting switcher 123 configured to switch the setting state of the skew adjusting function between the valid state and the invalid state. The aforementioned particular condition includes a requirement that the skew adjusting function is set in the valid state (see S140 in FIG. 5). Therefore, according to the illustrative embodiment, the MFP 100 is enabled to, by switching the setting state of the skew adjusting function, switch the histogram for setting the threshold Th for binarization processing between the original histogram HGo and the adjusted histogram HGa. For instance, the MFP 100 is allowed to select an execution mode for performing the binarization processing depending on a required level of processing accuracy and/or a required processing time. Specifically, for example, when a higher priority is put on high processing accuracy, the MFP 100 is allowed to perform more appropriate binarization processing by setting the skew adjusting function valid. Meanwhile, when a higher priority is put on a short processing time, the MFP 100 is allowed to perform the binarization processing in a shorter period of time by setting the skew adjusting function invalid.

Further, the MFP 100 of the illustrative embodiment includes the edge pixel detector 125 configured to detect the edge pixels representing the edges of the document sheet DO out of the pixels forming the target image data Is. The condition determiner 124 specifies the skew angle θ (i.e., the angle difference between the orientation of the document sheet DO and the reference orientation) based on the positions (i.e., the positions of the edge lines EL that are aggregations of edge pixels) of the detected edge pixels. Thus, according to the illustrative embodiment, the MFP 100 is enabled to specify the skew angle θ with a simple configuration without any sensors.

Hereinabove, the illustrative embodiment according to aspects of the present disclosure has been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

2. Modifications

For example, various changes and modifications may be applied to the mechanical configurations of the image scanner 170 and the feeder 20 (see FIGS. 2 and 3) as exemplified in the aforementioned illustrative embodiment.

Figure 11:
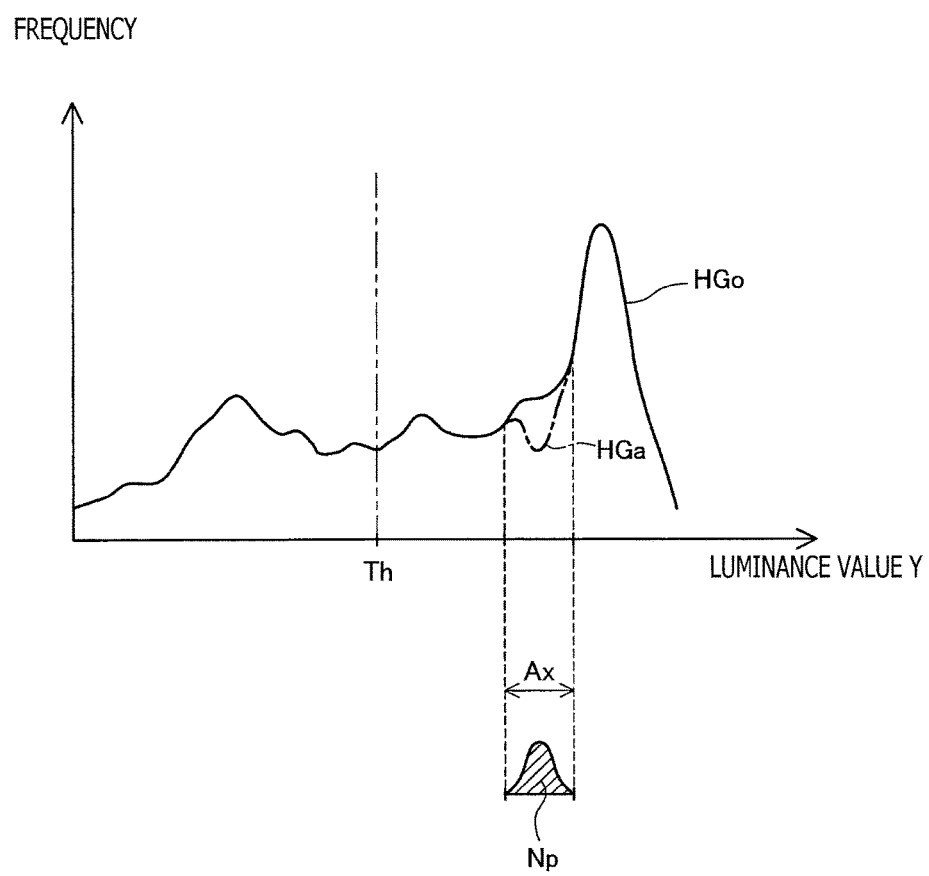
FIG. 11 is an illustration schematically showing how to generate an adjusted histogram, in a modification according to one or more aspects of the present disclosure.

Further, with respect to the binary image data generating process (see FIG. 5) as exemplified in the aforementioned illustrative embodiment, various changes and modifications may be applied to the process, e.g., by omitting some steps thereof, changing operations to be executed in some steps thereof, or changing an execution sequence of some steps thereof. For instance, in the aforementioned illustrative embodiment, as exemplified in FIG. 10, the adjustment range Ax for generating the adjusted histogram HGa (S170) is set to a range including the maximum value of the luminance values Y. However, the adjustment range Ax may not necessarily include the maximum value of the luminance values Y. FIG. 11 is an illustration schematically showing how to generate an adjusted histogram HGa in a modification according to aspects of the present disclosure. In the modification, the color of the backing portion (see FIG. 3) in the image scanner 170 is not white but gray. Therefore, the adjustment range Ax is not a range including the maximum value of the luminance values Y but is set to a range corresponding to luminance values Y representing the color of gray. Thus, the adjustment range Ax may be set to an appropriate range depending on the color of the backing portion BP.

In the aforementioned illustrative embodiment (see FIG. 10) and the modification (see FIG. 11), the number Np of the out-of-document pixels is apportioned among the luminance values Y within the adjustment range Ax in the original histogram HGo in accordance with the normal distribution. However, the number Np of the out-of-document pixels may be apportioned in accordance with other types of distribution. For instance, the number Np of the out-of-document pixels may be apportioned equally among the luminance values Y within the adjustment range Ax in the original histogram HGo. Further, the adjustment range Ax may not necessarily include a plurality of luminance values Y. The adjustment range Ax may only include a single luminance value Y. Namely, the number Np of the out-of-document pixels may not be apportioned among a plurality of luminance values Y but may be allocated only to a particular single luminance value Y (e.g., the maximum value of the luminance values Y).

In the aforementioned illustrative embodiment (see FIG. 10) and the modification (see FIG. 11), the adjusted histogram HGa is generated by subtracting the number Np of the out-of-document pixels from the frequencies of the luminance values Y within the adjustment range Ax in the original histogram HGo. Nonetheless, the adjusted histogram HGa may be generated by subtracting only a part of the number Np of the out-of-document pixels from the frequencies of the luminance values Y within the adjustment range Ax in the original histogram HGo.

In the aforementioned illustrative embodiment, the particular condition for the adjusted histogram HGa to be generated includes the requirement that the setting state of the skew adjusting function is the valid state, as well as the requirement that the skew angle θ (the angle difference between the orientation of the document sheet DO and the reference orientation in the image scanning) is equal to or larger than the particular value. However, the particular condition for the adjusted histogram HGa to be generated may not necessarily include the requirement that the setting state of the skew adjusting function is the valid state. Further, the particular condition for the adjusted histogram HGa to be generated may include other requirements than the above two requirements.

In the aforementioned illustrative embodiment, the original histogram HGo is generated regardless of whether the above particular condition is satisfied (see S120 in FIG. 5). Further, when the particular condition is satisfied, the adjusted histogram HGa is generated based on the original histogram HGo. Nonetheless, when the particular condition is satisfied, the adjusted histogram HGa may be directly generated without generation of the original histogram HGo. For instance, the histogram generator 122 may previously subtract the number Np of the out-of-document pixels from the frequencies of the luminance values Y within the adjustment range Ax and then calculate a specific frequency of each luminance value Y with respect to all the pixels included in the target image data Is. Thereby, the adjusted histogram HGa may be generated directly from the target image data Is.

In the aforementioned illustrative embodiment, the binary image data generating process is premised on that image scanning is performed in the ADF method. Nonetheless, when image scanning is performed in the flatbed method as well, the binary image data generating process may be executed. Skewing of the document sheet DO (i.e., a discrepancy between the orientation of the document sheet DO and the reference orientation) may occur when image scanning is performed in the flatbed method. Therefore, even when image scanning is performed in the flatbed method, it is possible to perform appropriate binarization process for the actual image of the document sheet DO by executing the same binary image data generating process as exemplified in the aforementioned illustrative embodiment.

In the aforementioned illustrative embodiment, the target image data Is is RGB data. Nonetheless, the target image data Is may be image data expressed in other color systems (i.e., in other color spaces). Alternatively, the target image data Is may be monochrome image data or grayscale image data. Further, in the aforementioned illustrative embodiment, the histogram of the luminance value Y is used. However, a histogram may be used of one of other index values (e.g., the G component) representing a luminance level, instead of the luminance value Y as such.

In the aforementioned illustrative embodiment, the discrimination analysis method (i.e., Otsu's method) is used to set the threshold Th for binarization processing. However, other methods may be used as long as those are methods to set the threshold Th based on a histogram. Further, instead of the process to generate the YCbCr data from the target image data Is in the aforementioned illustrative embodiment, a process to calculate luminance values Y from the target image data Is may be performed.

In the aforementioned illustrative embodiment, the binary image data generating process is performed by the MFP 100 including the image former 160 and the image scanner 170. Nonetheless, at least a part of the steps S110 to S190 of the binary image data generating process may be executed by other image processing apparatuses (e.g., an image scanner and a personal computer). For instance, among the steps S110 to S190 of the binary image data generating process (see FIG. 5), the step S110 may be executed by the MFP 100 or an image scanner, the other steps may be executed by a personal computer (more specifically, a CPU of the personal computer) that has received the target image data Is generated in S110. The CPU of the personal computer may be configured to perform image processing in accordance with a scanner driver or one or more other application programs.

Further, a part of configurations and functions achieved by hardware elements in the aforementioned illustrative embodiment may be achieved by software. Meanwhile, a part of configurations and functions achieved by software in the aforementioned illustrative embodiment may be achieved by hardware elements.

With respect to associations of elements exemplified in the aforementioned illustrative embodiment with elements to be defined according to aspects of the present disclosure, the MFP 100 may be an example of an image processing apparatus according to aspects of the present disclosure. The rear sensor 50 may be an example of a document position detector according to aspects of the present disclosure.

What is claimed is:

1. An image processing apparatus comprising:
   an image scanner; and
   a controller configured to perform a binary image data generating process comprising:
      controlling the image scanner to perform an image scanning process to scan a document sheet, thereby generating target image data formed by a plurality of pixels;
      generating an original histogram of an index value representing a luminance of each of the plurality of pixels forming the target image data;
      determining whether a particular condition is satisfied, the particular condition including a requirement that a difference value between an orientation of the document sheet and a reference orientation in the image scanning process is equal to or larger than a particular value;
      in response to determining that the particular condition is satisfied, calculating a count of out-of-document pixels included in the plurality of pixels forming the target image data, the out-of-document pixels being pixels other than pixels representing an image of the document sheet;
      generating an adjusted histogram by subtracting at least a part of the count of the out-of-document pixels from frequencies of index values within a particular range in the original histogram;
      setting a specific threshold of the index value for binarization processing, based on the adjusted histogram; and
      performing binarization processing to generate binary image data from the target image data, using the specific threshold set based on the adjusted histogram.

2. The image processing apparatus according to claim 1, wherein the binary image data generating process further comprises:
   in response to determining that the particular condition is not satisfied, setting a threshold of the index value for binarization processing, based on the original histogram; and
   performing binarization processing to generate binary image data from the target image data, using the threshold set based on the original histogram.

3. The image processing apparatus according to claim 1, wherein the binary image data generating process further comprises:
   calculating the count of the out-of-document pixels based on the difference value between the orientation of the document sheet and the reference orientation in the image scanning process.

4. The image processing apparatus according to claim 1, wherein the binary image data generating process further comprises:
   generating the adjusted histogram by:
      apportioning at least the part of the count of the out-of-document pixels among the index values within the particular range in accordance with a normal distribution; and
      subtracting a corresponding number of out-of-document pixels allocated to each of the index values within the particular range from the frequency of each index value within the particular range in the original histogram.

5. The image processing apparatus according to claim 1, further comprising a document position detector configured to detect a position of the document sheet,
   wherein the binary image data generating process further comprises:

controlling the image scanner to perform the image scanning process in a specific mode to scan the document sheet over a scanning area including a document corresponding area and an extended area, the document corresponding area being set based on the position of the document sheet detected by the document position detector, the extended area being adjacent to the document corresponding area in a particular direction; and when the image scanning process is performed in the specific mode, calculating the count of the out-of-document pixels based on a size of the extended area.

6. The image processing apparatus according to claim 1, wherein the binary image data generating process further comprises:
generating original image data by controlling the image scanner to perform the image scanning process in a specific mode to scan the document sheet over a scanning area that is set large enough to encompass a whole image of the document image; and
generating the target image data by trimming an area other than a specific area having a predetermined shape and encompassing the whole image of the document sheet in the original image data.

7. The image processing apparatus according to claim 1, wherein the controller is further configured to:
switch a setting state of a skew adjusting function between a valid state and an invalid state; and
when the skew adjusting function is set in the valid state, generate the adjusted histogram based on the original histogram and set the specific threshold based on the adjusted histogram, and
wherein the particular condition further includes a requirement that the skew adjusting function is set in the valid state.

8. The image processing apparatus according to claim 1, wherein the binary image data generating process further comprises:
detecting edge pixels representing edges of the document sheet out of the plurality of pixels forming the target image data;
calculating the difference value between the orientation of the document sheet and the reference orientation in the image scanning process, based on positions of the detected edge pixels; and
determining whether the requirement included in the particular condition is satisfied, by determining whether the calculated difference value is equal to or larger than the particular value.

9. The sheet feeder according to claim 1, wherein the controller comprises:
a processor; and
a memory storing processor-executable instructions configured to, when executed by the processor, cause the processor to perform the binary image data generating process.

10. A method implementable on a processor coupled with an image scanner, the method comprising:
controlling the image scanner to perform an image scanning process to scan a document sheet, thereby generating target image data formed by a plurality of pixels;
generating an original histogram of an index value representing a luminance of each of the plurality of pixels forming the target image data;
determining whether a particular condition is satisfied, the particular condition including a requirement that a difference value between an orientation of the document sheet and a reference orientation in the image scanning process is equal to or larger than a particular value;
in response to determining that the particular condition is satisfied, calculating a count of out-of-document pixels included in the plurality of pixels forming the target image data, the out-of-document pixels being pixels other than pixels representing an image of the document sheet;
generating an adjusted histogram by subtracting at least a part of the count of the out-of-document pixels from frequencies of index values within a particular range in the original histogram;
setting a specific threshold of the index value for binarization processing, based on the adjusted histogram; and
performing binarization processing to generate binary image data from the target image data, using the specific threshold set based on the adjusted histogram.

11. The method according to claim 10, further comprising:
in response to determining that the particular condition is not satisfied, setting a threshold of the index value for binarization processing, based on the original histogram; and
performing binarization processing to generate binary image data from the target image data, using the threshold set based on the original histogram.

12. A non-transitory computer-readable medium storing computer-readable instructions that are executable by a processor coupled with an image scanner, the instructions being configured to, when executed by the processor, cause the processor to:
control the image scanner to perform an image scanning process to scan a document sheet, thereby generating target image data formed by a plurality of pixels;
generate an original histogram of an index value representing a luminance of each of the plurality of pixels forming the target image data;
determine whether a particular condition is satisfied, the particular condition including a requirement that a difference value between an orientation of the document sheet and a reference orientation in the image scanning process is equal to or larger than a particular value;
in response to determining that the particular condition is satisfied, calculate a count of out-of-document pixels included in the plurality of pixels forming the target image data, the out-of-document pixels being pixels other than pixels representing an image of the document sheet;
generate an adjusted histogram by subtracting at least a part of the count of the out-of-document pixels from frequencies of index values within a particular range in the original histogram;
set a specific threshold of the index value for binarization processing, based on the adjusted histogram; and
perform binarization processing to generate binary image data from the target image data, using the specific threshold set based on the adjusted histogram.

13. The non-transitory computer-readable medium according to claim 12,
wherein the instructions are further configured to cause the processor to:

in response to determining that the particular condition is not satisfied, set a threshold of the index value for binarization processing, based on the original histogram; and perform binarization processing to generate binary image data from the target image data, using the threshold set based on the original histogram.

* * * * *